US011403066B2

(12) United States Patent
Hanes

(10) Patent No.: US 11,403,066 B2
(45) Date of Patent: *Aug. 2, 2022

(54) APPLICATION-SPECIFIC PROFILE MANAGERS

(71) Applicant: HEWLETT-PACKARD DEVELOPMENT COMPANY, L.P., Spring, TX (US)

(72) Inventor: David H. Hanes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,721

(22) Filed: Jan. 6, 2021

(65) Prior Publication Data

US 2021/0124556 A1 Apr. 29, 2021

Related U.S. Application Data

(63) Continuation of application No. 16/482,271, filed as application No. PCT/US2017/040709 on Jul. 5, 2017, now Pat. No. 10,922,051.

(51) Int. Cl.
*G06F 3/01* (2006.01)
*G06F 3/16* (2006.01)

(52) U.S. Cl.
CPC .............. *G06F 3/167* (2013.01); *G06F 3/017* (2013.01)

(58) Field of Classification Search
None
See application file for complete search history.

(56) References Cited

U.S. PATENT DOCUMENTS

| 5,680,524 | A | 10/1997 | Maples |
| 6,456,977 | B1 | 9/2002 | Wang |
| 7,516,077 | B2 | 4/2009 | Yokoi et al. |
| 9,472,205 | B2 | 10/2016 | Kolavennu et al. |
| 9,474,977 | B2 | 10/2016 | Rom et al. |
| 9,479,858 | B2 | 10/2016 | Kulavik |
| 9,511,294 | B2 | 12/2016 | Kulavik et al. |
| 2007/0168191 | A1 | 7/2007 | Bodin |
| 2011/0093820 | A1 | 4/2011 | Zhang |
| 2012/0034904 | A1 | 2/2012 | Lebeau |
| 2014/0359435 | A1 | 12/2014 | Zheng et al. |
| 2015/0084743 | A1 | 3/2015 | G |
| 2016/0071521 | A1 | 3/2016 | Haughay |
| 2018/0043246 | A1 | 2/2018 | Chang |
| 2020/0105264 | A1* | 4/2020 | Jang ........................ G06F 3/167 |

FOREIGN PATENT DOCUMENTS

EP 2154678 A1 2/2010

OTHER PUBLICATIONS

Android 5.0 Lollipop Lets You Change Some Device Settings with 'OK, Google' Voice Command, Feb. 22, 2015.

* cited by examiner

*Primary Examiner* — Joseph R Haley
(74) *Attorney, Agent, or Firm* — Fabian VanCott

(57) ABSTRACT

A computing device may include a processor, a plurality of input devices communicatively coupled to the processor of the computing device, a voice recognition device to detect audible input from a user, and a profile manager to manage application specific profiles for the plurality of input devices and, when executed by the processor, establish an application specific profile based on the audible input received by the voice recognition device.

20 Claims, 3 Drawing Sheets

APPLICATION-SPECIFIC PROFILE MANAGERS

BACKGROUND

Computing devices include a number of input devices used by the user to interact with the computing device. As the number of applications executable on the computing device increases, the number and type of these input devices also increases.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
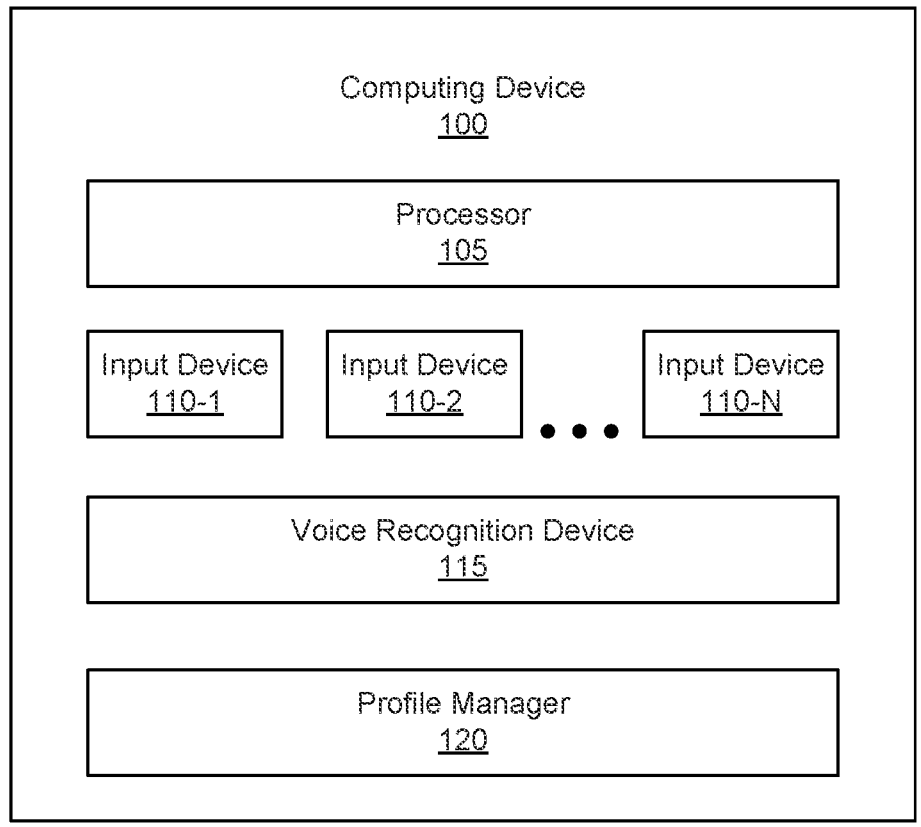
FIG. 1 is a diagram of a computing device according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

During operation of a computing device, various numbers and types of input devices may be used in order to facilitate interaction between the user and the computing device. Additionally, the computing device may, via a processing device, execute a variety of different applications represented by computer usable program code. Each of these different applications may receive input from the number of variety of input devices.

Each of the input devices may be individually customized to have user-defined settings. A user may interface with a graphical user interface presented on a display device in order to customize features of the input device and how the computing device receives input therefrom. In some examples, however, certain options and customization of those options associated with each of the input devices may not be beneficial or practical when used in connection with different applications executed by the processor. For example, certain customized options associated with the use of a mouse while executing a computer game may not be beneficial when also used in connection with a word processing application. Even further, certain input characteristics of a mouse associated with the execution of one type of computing game may not be appropriate or, at least, beneficial when executing a different type of game on the computing device.

The present specification describes a computing device that includes a processor, a plurality of input devices communicatively coupled to the processor of the computing device, a voice recognition device to detect audible input from a user, and a profile manager to manage a number of application specific profiles for the plurality of input devices and, when executed by the processor, establish an application specific profile based on the audible input received by the voice recognition device.

The present specification also describes a peripheral device manager that includes a processing device, an input device detection module to, when executed by the processor, detect a plurality of input devices communicatively coupled to the peripheral device manager, and a profile manager to, when executed by the processor, establish a number of application-specific profiles that associate a number of user-defined settings associated with a plurality of user devices to a specific application to be executed.

The present specification further describes a computer program product for executing application-specific profiles, the computer program product that includes a computer readable storage medium including computer usable program code embodied therewith, the computer usable program code to, when executed by a processor receive input from a user indicating a plurality of input devices are associated with a specific application to be executed on a computing device, receive input from a user indicating a number of settings to be used with the plurality of input devices when the specific application is being executed on the computing device, and create application-specific input device profiles based on the application specific settings and input devices.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Turning now to the figures, FIG. 1 is a diagram of a computing device (100) according to an example of the principles described herein. The computing device (100) may include a processor (105), a plurality of input devices (110-1, 110-2, ... 110-N), a voice recognition device (115), and a profile manager (120). The computing device (100) provides, in some examples, the ability to configure any single or a plurality of input devices (110-1, 110-2, ... 110-N) using voice commands. Additionally, the computing device (100) may maintain, via the profile manager (120), a number of application-specific profiles defining customized settings for each of the plurality of input devices (110-1, 110-2, ... 110-N) used to interface with a specific application being executed by the computing device (100).

The computing device (100) may be implemented in an electronic device. Examples of electronic devices include servers, desktop computers, laptop computers, personal digital assistants (PDAs), mobile devices, smartphones, gaming systems, and tablets, among other electronic devices.

The computing device (100) may be utilized in any data processing scenario including, stand-alone hardware, mobile applications, through a computing network, or combinations thereof. Further, the computing device (100) may be used in a computing network, a public cloud network, a private cloud network, a hybrid cloud network, other forms of networks, or combinations thereof.

To achieve its desired functionality, the computing device (100) comprises various hardware components. Among these hardware components is the processor (105), a number of data storage devices, a number of peripheral device adapters, and a number of network adapters. These hardware components may be interconnected through the use of a number of busses and/or network connections. In one example, the processor (105), data storage device, peripheral device adapters, and a network adapter may be communicatively coupled via a bus.

The processor (105) may include the hardware architecture to retrieve executable code from the data storage device and execute the executable code. The executable code may, when executed by the processor (105), cause the processor (105) to implement at least the functionality of receiving input from a user indicating a plurality of input devices are associated with a specific application to be executed on a computing device, receiving input from a user indicating a number of settings to be used with the plurality of input devices when the specific application is being executed on the computing device, and creating application-specific input device profiles based on the application specific settings and input devices. This functionality may be according to the methods of the present specification described herein. In the course of executing code, the processor (105) may receive input from and provide output to a number of the remaining hardware units.

The data storage device may store data such as executable program code that is executed by the processor (105) or other processing device. The data storage device may specifically store computer code representing a number of applications that the processor (105) executes to implement at least the functionality described herein. The data storage device may include various types of memory modules, including volatile and nonvolatile memory. For example, the data storage device of the computing device (100) includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor (105) may boot from Read Only Memory (ROM), maintain nonvolatile storage in the Hard Disk Drive (HDD) memory, and execute program code stored in Random Access Memory (RAM). Generally, the data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the computing device (100) enable the processor (105) to interface with various other hardware elements, external and internal to the computing device (100). For example, the peripheral device adapters may provide an interface to the plurality of input devices (110-1, 110-2, . . . 110-N), that may include a display device, headset including a microphone and other input aspects, a mouse, a keyboard, a joystick, a camera device, a video device, a voice recognition device, and a sensor, among others. The peripheral device adapters may also provide access to other external devices such as an external storage device, a number of network devices such as, for example, servers, switches, and routers, client devices, other types of computing devices, and combinations thereof.

The display device may be provided to allow a user of the computing device (100) to interact with and implement the functionality of the computing device (100). The peripheral device adapters may also create an interface between the processor (105) and the display device, a printer, or other media output devices. The network adapter may provide an interface to other computing devices within, for example, a network, thereby enabling the transmission of data between the computing device (100) and other devices located within the network.

The computing device (100) may, when executed by the processor (105), display the number of graphical user interfaces (GUIs) on the display device associated with the executable program code representing the number of applications stored on the data storage device. The GUIs may include aspects of the executable code including providing an interface with a user so as to receive input from a user indicating a plurality of input devices are associated with a specific application to be executed on a computing device, receive input from a user indicating a number of settings to be used with the plurality of input devices when the specific application is being executed on the computing device, and create application-specific input device profiles based on the application specific settings and input devices. Examples of display devices include a computer screen, a laptop screen, a mobile device screen, a personal digital assistant (PDA) screen, and a tablet screen, among other display devices.

The computing device (100) further includes a voice recognition device (115) used to receive audio input from a user. As will be described herein, the voice recognition device (115) may receive input from a user to select an application-specific profile associated with a certain application being executed on the computing device (100). In an example, the application-specific profile may define any number of customized settings for the plurality of input devices (110-1, 110-2, . . . 110-N). As an example, the voice recognition device (115) may receive input from a user describing a specific application to be executed by the processor (105) of the computing device (100). In this example, the computing device (100) may execute that application using the preconfigured customized settings for the plurality of input devices (110-1, 110-2, . . . 110-N). When the user implements the voice recognition device (115) to select a different application to be executed by the processor (105), a different set of preconfigured customized settings for a different set of plurality of input devices (110-1, 110-2, . . . 110-N) may be executed. In an example, the preconfigured customized settings may be set by a user implementing the GUIs via a display device as described herein. As an example, a user may be provided with a specific GUI requesting a user to provide customized settings for a plurality of input devices (110-1, 110-2, . . . 110-N) to be used in connection with a specific application to be executed by the processor (105) of the computing device (100). In an example, the user may initially indicate the number of input devices (110-1, 110-2, . . . 110-N) to be used in connection with the application. The user may then be provided with a number of GUIs requesting specific customizations of each of the plurality of input devices (110-1, 110-2, . . . 110-N). The profile manager (120) may record changes to settings related with each of the plurality of input devices (110-1, 110-2, . . . 110-N) and associate those customized settings with that specific application. Further, the profile manager (120) may cause a database to be created in a data storage device describing, at least, the plurality of input devices (110-1, 110-2, . . . 110-N) to be associated with the specific application to be executed, the customized settings associated with those plurality of input devices (110-1, 110-2, . . . 110-N), and the customized settings associated with the specific application to be executed. This allows a user a level of customization of settings for the plurality of input devices (110-1, 110-2, . . . 110-N) not previously realized. Indeed, a user may further delineate between executed applications of the same or similar such as two individual types of gaming applications.

For example, a user may have installed two individual gaming applications within the computing device (100), the settings, and even number of, the plurality of input devices (110-1, 110-2, . . . 110-N) may be customized to fit the user's use of those plurality of input devices (110-1, 110-2, . . . 110-N). The present specification contemplates that, for this example, the "gameplay" of these distinct gaming applications may be similar, but that the user may wish to customize the settings of each of the plurality of input devices (110-1, 110-2, . . . 110-N) differently as best fits the user's feel of play.

By setting the customization settings for each of the plurality of input devices (110-1, 110-2, . . . 110-N) and also associating the number and customized settings of the plurality of input devices (110-1, 110-2, . . . 110-N) with a specific application to be executed, a user may implement the voice recognition device (115) to select the application to be executed with the profile manager (120) with the customized settings for each of the plurality of input devices (110-1, 110-2, . . . 110-N) being implemented. As a user switches to a second type of application, the profile manager (120) may pull from the database those customized settings previously associated with the second type of application.

In an example, the profile manager (120) of the computing device (100) may determine that, for a first application being executed by the processor (105), no customized settings have been defined for any particular input device (110-1, 110-2, . . . 110-N) and/or no number of the plurality of input devices (110-1, 110-2, . . . 110-N) have been associated with the first application. In this example, the profile manager (120) may compare aspects of the first application to be executed with aspects of other applications within the computing device (100) and assign the same or similar customization settings associated with the other application to the first application. In this example, the profile manager (120) may cause a notice to be presented to the user indicating that no profile has been set for the first application and that a profile of a similar application is being used. A separate notice may allow a user to accept the customized settings associated with the other application and continue with the execution of the first application based on the profile of the different application. Additionally, the user can reject those customized settings and be provided with the opportunity to customize settings and input devices (110-1, 110-2, . . . 110-N) to be associated with the application. In these examples, the comparison of the application to be executed with other applications on the computing device (100) may take into consideration the type of application, the programmer of the application, the owner of the application, the seller of the application, and the computer usable program code defining the application, among others. With this type of comparison, a user may, at least, be allowed to add or subtract at least one of the plurality of input devices (110-1, 110-2, . . . 110-N) to a new profile to be associated with the executing application and customize the selected input devices (110-1, 110-2, . . . 110-N) differently.

The types of settings that may be customized at each of the plurality of input devices (110-1, 110-2, . . . 110-N) may be numerous. As examples, the customizable settings may include, the volume of any audio output device, the audio characteristics of any audio output device, a temperature of any output device, the illumination of any light-emitting diodes (LEDs) on any input device as well as the computing system chassis, the color of any LEDS on any input device as well as the computing system chassis, the intensity of the LEDs on any input device as well as the computing system chassis, the assignments of any buttons or keys to specific tasks native to the input device (110-1, 110-2, 110-N), the assignments of any buttons or keys to specific tasks not originally inherent to the plurality of input devices (110-1, 110-2, . . . 110-N), the resolution of a mouse action, the lift-off distance characteristic, a dots-per-inch characteristic, among others. In an example, a user may audibly select an application to be executed by the voice recognition device (115) and a plurality of input devices (110-1, 110-2, . . . 110-N) may be addressable by the user with the aesthetics and functions of the plurality of input devices (110-1, 110-2, . . . 110-N) implementing the customized settings per the profile associated with the application.

In an example, during operation of the computing device (100), a user may cause an application to be executed by the processor (105) of the computing device (100). As described herein, this results in the execution of a profile associated with the application. As the profile is executed, the user may be provided with the option to change the settings as defined in the profile either temporarily or permanently. This may be done by the user indicating specific commands through the voice recognition device (115). After exiting or other disabling the execution of the application, the computing device (100) may present a GUI to the user requesting input as to whether the changes to the settings should be saved or rejected in later executions of the application.

In an example, the computing device (100) may further include an electromagnetic device in addition to or in lieu of the voice recognition device (115). The electromagnetic device may detect gestural actions of a user. These gestural actions may indicate to the computing device (100) that a specific application is to be executed by the processor (105) of the computing device (100). By way of example, the electromagnetic device may be an electromagnetic sensitive pad placed underneath a keyboard, underneath other input devices, and/or inside an input device and may be communicatively coupled at least to the processor (105) of the computing device (100). During operation, a user may pass a hand over the electromagnetic pad in a pattern indicative of the selection of a specific application to be executed. Similar to the voice recognition device (115) described above, the selection of the specific application also executes an application-specific profile with customized settings for each of the plurality of input devices (110-1, 110-2, . . . 110-N) as described herein. Additionally, during operation of the computing device (100) and during execution of the application with its associated profile, a user may further augment at least one setting of at least one of the plurality of input devices (110-1, 110-2, . . . 110-N) by providing additional hand gestures indicative of changes to the at least one setting.

Figure 2:
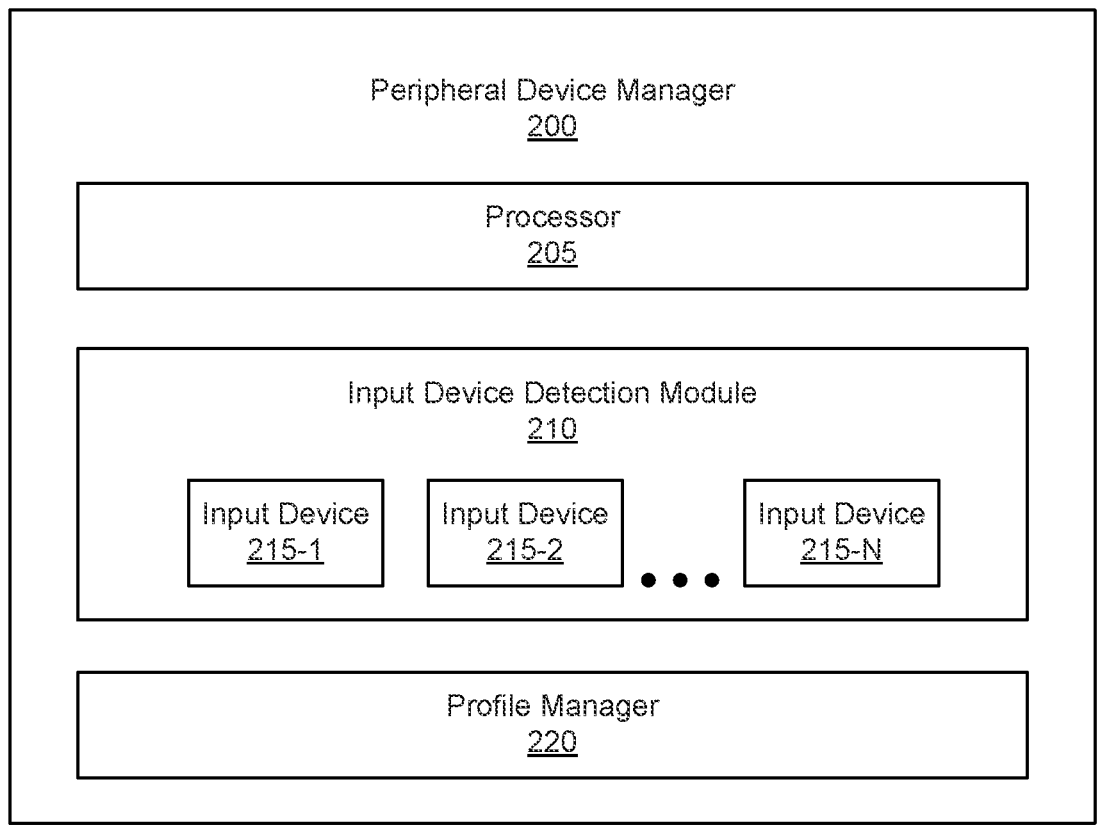
FIG. 2 is a block diagram of peripheral device manager according to an example of the principles described herein.

FIG. 2 is a block diagram of peripheral device manager (200) according to an example of the principles described herein. The peripheral device manager (200) may include a processing device (205), an input device detection module (210) capable of detecting a plurality of input devices (215-1, 215-2, 215-N), and a profile manager (220). The processing device (205), plurality of input devices (215-1, 215-2, 215-N), and profile manager (220) may be similar to the processor (105), plurality of input devices (110-1, 110-2, . . . 110-N), and profile manager (120) as described in connection with FIG. 1.

The input device detection module (210) may include devices that detect the plurality of input devices (215-1, 215-2, 215-N) when coupled to the peripheral device manager (200). In an example, the input device detection module (210) may execute a driver automatically when at least one of the plurality of input devices (215-1, 215-2, 215-N) is communicatively coupled to the input device detection module (210).

The peripheral device manager (200) may form part of a computing device or computing device network. In an example, the peripheral device manager (200) may be a module within a computing device defined by computer usable program code. In an example, the peripheral device manager (200) may be a module within a server operating with a computing network with a number of computing devices capable of accessing the peripheral device manager (200).

The peripheral device manager (200) may manage the settings of the plurality of input devices (215-1, 215-2, 215-N) by providing to a user a number of GUIs defining settings available for each of the plurality of input devices (215-1, 215-2, 215-N). As any of the plurality of input devices (215-1, 215-2, 215-N) are communicatively coupled to the peripheral device manager (200), the peripheral device manager (200) may provide a GUI describing, at least, the settings available for each of the plurality of input devices (215-1, 215-2, 215-N), the type and/or specific application each of the plurality of input devices (215-1, 215-2, 215-N) are to be associated with, and the individual settings of each of the plurality of input devices (215-1, 215-2, 215-N) to be associated with any specific application to be or being executed by the processing device (205).

Figure 3:
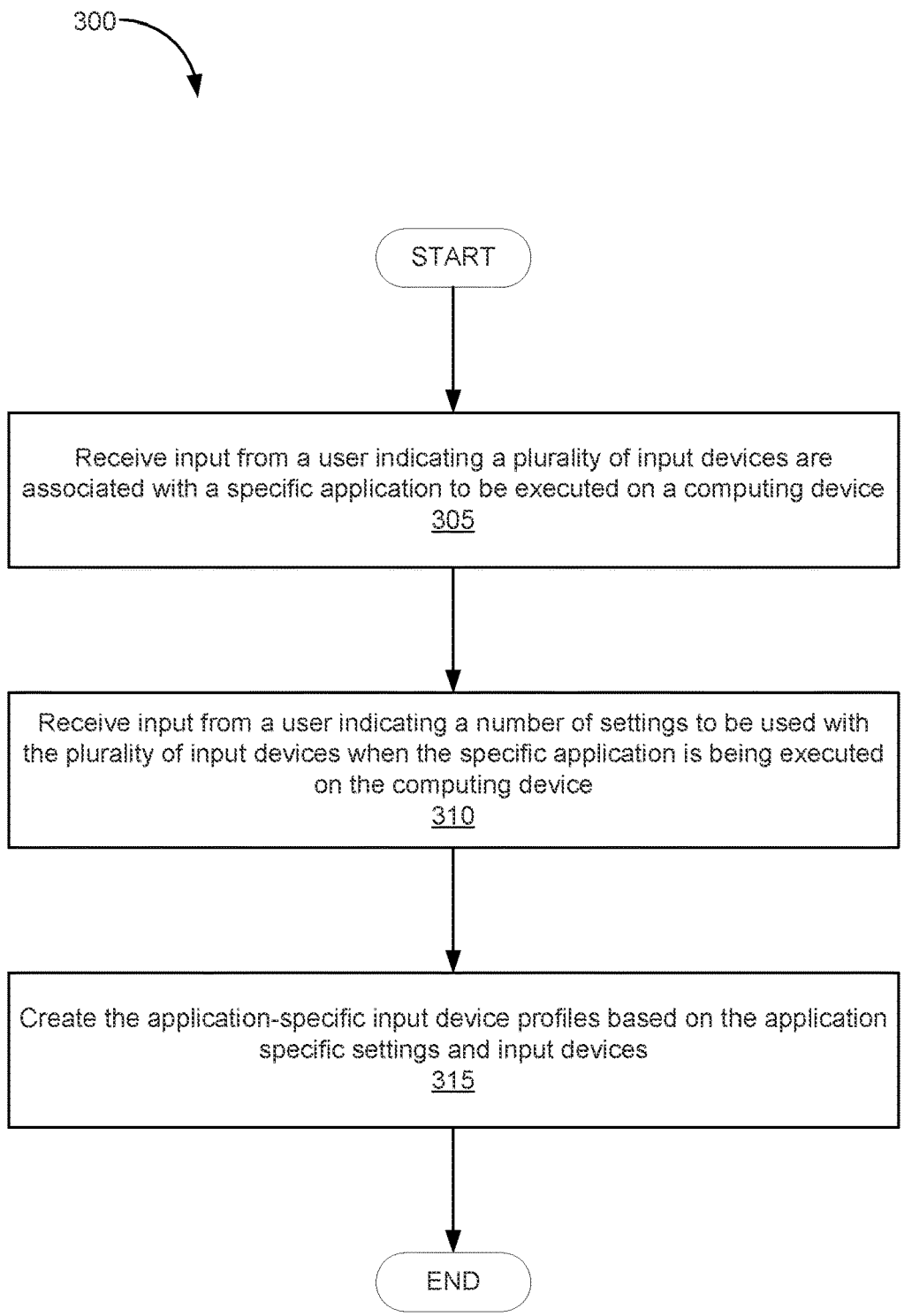
FIG. 3 is a flowchart showing a method of executing application-specific profiles according to an example of the principles described herein.

FIG. 3 is a flowchart showing a method (300) of executing application-specific profiles according to an example of the principles described herein. The method (300) may begin with receiving input (305) from a user indicating a plurality of input devices (110-1, 110-2, . . . 110-N) are associated with a specific application to be executed on a computing device (100). As described herein, a number of GUIs may be provided to the user to facilitate the receipt (305) of input from the user.

The method (300) may continue with receiving input (310) from a user indicating a number of settings to be used with the plurality of input devices (110-1, 110-2, . . . 110-N) when the specific application is being executed on the computing device (100). As described herein, the user may be presented with input device-specific GUIs asking how and what settings associated with any of the plurality of input devices (110-1, 110-2, . . . 110-N) is to be defined in the profile associated with the application.

The method (300) may continue with creating (315) the application-specific input device profiles based on the application specific settings and plurality of input devices (110-1, 110-2, . . . 110-N). As described herein, the created (315) profiles may be maintained in a database of the computing device (100). During execution of the application, the associated application-specific profile may be called by the processor (105) of the computing device (100) and is used to set the settings as defined in the profile.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (105) of the computing device (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describes an application-specific profile manager that helps a user to create and execute application-specific profiles. The application-specific profiles define customized settings for a plurality of input devices to be used for the application. The user, therefore, may provide minimal input from a voice recognition device or electromagnetic device, for example, in order to both cause the specific application to be executed as well as the application-specific profile associated with that application. Upon switching from one application to another using, for example, the voice recognition device or electromagnetic device a different profile may be executed that is associated with that newly executed application. Additionally, the user may, during execution of an application and its associated profile, further implement the voice recognition device and/or electromagnetic device to, at least, temporarily change a number of settings as defined in the profile. The use of the computing device with the application-specific profiles is a convenient way for a user to switch from one set of settings associated with a first set of plurality of input devices to a different set of settings associated with a second set of plurality of input devices. A user implementing the methods and the computing device (100) described herein has a relatively easier ability to manage settings of a plurality of input devices across a wide variety of input devices on a per-application basis. Additionally, voice control allows for a natural way to interact with input device settings and adjustment of those settings may be easily done during execution of the application.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computing device, comprising:
a processor;
a voice recognition device to detect audible input from a user; and
a profile manager to manage application-specific profiles for a plurality of input devices communicatively coupled to the processor of the computing device and, when executed by the processor, create an application-specific profile based on electromagnetic input and the audible input received by the voice recognition device, the application-specific profile including a definition for a setting for a first input device having a sensor placed under the first input device or inside the first input device;
wherein, during execution of an application associated with the application-specific profile, the voice recognition device detects device-specific audible input regarding the first input device from a user and adjusts settings associated with the first input device.

2. The computing device of claim 1, wherein an electromagnetic sensor is placed under at least one of the plurality of input devices to receive user input during execution of the application associated with the application-specific profile.

3. The computing device of claim 1, wherein the sensor is an electromagnetic sensor to detect hand gestures of a user and, when executed by the processor, is to establish an application-specific profile based on the detected hand gestures received by the electromagnetic sensor.

4. The computing device of claim 3, wherein the electromagnetic sensor is placed under at least one of the plurality of input devices.

5. The computing device of claim 4, wherein, during execution of the application associated with the application-specific profile, the electromagnetic sensor detects further hand gestures associated with the at least one of the plurality of input devices from the user and adjusts settings associated with the first input device.

6. The computing device of claim 1, wherein the plurality of input devices comprises a keyboard, a joystick, a mouse, a touchpad, a headset, a computing system chassis or combinations thereof.

7. The computing device of claim 1, wherein the profile manager receives input from a user to establish settings specific to the first input device to be associated with each of the application-specific profiles.

8. The computing device of claim 1, wherein the application-specific profile includes data describing user-actuatable hotkeys, light-emitting diode (LED) color, LED intensity, action assignments to user-actuatable keys, resolution, lift-off distance, dots per inch, or a combination thereof.

9. A peripheral device manager, comprising:
a processing device;
a voice recognition device to detect audible input from a user; and
an input device detection module to, when executed by the processor, detect a plurality of input devices communicatively coupled to the peripheral device manager; and
a profile manager to, when executed by the processor, create an application-specific profile based on audible input and electromagnetic input, wherein the application-specific profile associates settings associated with the plurality of input devices to a specific application to be executed;
wherein, during execution of the specific application associated with the application-specific profile, the voice recognition device detects device-specific audible input from a user regarding a first input device of the plurality of input devices, and adjusts settings associated with the first input device.

10. The peripheral device manager of claim 9, wherein the peripheral device manager further receives input from a user during execution of the specific application to adjust settings associated with any of the plurality of input devices.

11. The peripheral device manager of claim 9, further comprising a data storage device to maintain a number of application-specific profiles.

12. The peripheral device manager of claim 9, wherein the processor receives input from the voice recognition module, an electromagnetic sensor or combinations thereof indicating which of a number of application-specific profiles to engage.

13. The peripheral device manager of claim 9, wherein each of the input devices of the plurality of input devices is individually customized to have user-defined settings as defined by corresponding application-specific profiles.

14. The peripheral device manager of claim 9, wherein:
the application-specific profile includes a definition for a setting for a first input device of the plurality of input devices, and
a sensor is located under the first input device or inside the first input device, the sensor to detect gestures of a user.

15. The peripheral device manager of claim 14, wherein the sensor is an electromagnetic sensor placed under the first input device,
the electromagnetic sensor is able to detect hand gestures of the user, and
the application-specific profile is created based on signals corresponding to hand gestures detected by the electromagnetic sensor.

16. A computer program product for executing application-specific profiles, the computer program product comprising:
a computer readable storage medium comprising computer usable program code embodied therewith, the computer usable program code to, when executed by a processor:
receive input from a user indicating that a plurality of input devices is associated with a specific application to be executed on a computing device;
receive input from a user indicating settings to be used with the plurality of input devices when the specific application is being executed on the computing device;
create a number of application-specific input device profiles based on the application specific settings and input devices; and
during execution of the specific application, receive spoken user input through a voice recognition device, the spoken user input regarding a first input device of the plurality of input devices; and
adjusting settings associated with the first input device responsive to the spoken user input.

17. The computer program product of claim 16, further comprising computer usable program code to, when executed by the processor, receive input from the voice recognition device indicating an application-specific profile to be executed.

18. The computer program product of claim 16, further comprising computer usable program code to, when executed by the processor, receive input from an electromagnetic sensor indicating a profile to be executed.

19. The computer program product of claim 16, wherein:
a corresponding application-specific input device profile includes a definition for a setting for the first input device, and
the input from a user is received, at least in part, from a sensor located under the first input device or inside the first input device.

20. The computer program product of claim 19, wherein:
the sensor is an electromagnetic sensor placed under the first input device,
the electromagnetic sensor is able to detect hand gestures of a user and,
the application-specific input device profile is created based on signals corresponding to hand gestures detected by the electromagnetic sensor.

* * * * *